US009699464B2

(12) United States Patent
Shao et al.

(10) Patent No.: US 9,699,464 B2
(45) Date of Patent: Jul. 4, 2017

(54) ADAPTIVE BITRATE STREAMING FOR WIRELESS VIDEO

(71) Applicant: Intel Corporation, Santa Clara, CA (US)

(72) Inventors: Lei Shao, Sunnyvale, CA (US); Yiting Liao, Hillsboro, OR (US); Inching Chen, Portland, OR (US); Chinh Cao, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 14/327,752

(22) Filed: Jul. 10, 2014

(65) Prior Publication Data

US 2016/0014418 A1  Jan. 14, 2016

(51) Int. Cl.
| | |
|---|---|
| *H04N 19/157* | (2014.01) |
| *H04N 19/184* | (2014.01) |
| *H04N 19/149* | (2014.01) |
| *H04N 19/15* | (2014.01) |
| *H04N 19/115* | (2014.01) |
| *H04N 19/174* | (2014.01) |
| *H04N 19/103* | (2014.01) |
| *H04N 19/124* | (2014.01) |
| *H04N 19/154* | (2014.01) |

(52) U.S. Cl.
CPC ......... *H04N 19/157* (2014.11); *H04N 19/115* (2014.11); *H04N 19/149* (2014.11); *H04N 19/15* (2014.11); *H04N 19/174* (2014.11); *H04N 19/184* (2014.11); *H04N 19/103* (2014.11); *H04N 19/124* (2014.11); *H04N 19/154* (2014.11)

(58) Field of Classification Search
CPC ............................. H04N 19/157; H04N 19/61
See application file for complete search history.

(56) References Cited

U.S. PATENT DOCUMENTS

| | | |
|---|---|---|
| 8,737,824 B1 | 5/2014 | Bultje |
| 2010/0189183 A1 | 7/2010 | Gu et al. |
| 2013/0223509 A1* | 8/2013 | Tweedale ......... H04N 21/23418 375/240.01 |
| 2013/0322516 A1 | 12/2013 | Zhang |
| 2013/0322517 A1 | 12/2013 | Zurpal |
| 2014/0119434 A1 | 5/2014 | Zhang |
| 2014/0201324 A1* | 7/2014 | Zhang ................. H04L 65/4084 709/217 |
| 2015/0373328 A1* | 12/2015 | Yenneti .................. H04N 19/61 375/240.03 |

OTHER PUBLICATIONS

International Search Report & Written Opinion, mailed Jan. 14, 2016, for U.S. Patent Application No. PCT/US2015/029298.

\* cited by examiner

*Primary Examiner* — Tung Vo
*Assistant Examiner* — Rowina Cattungal
(74) *Attorney, Agent, or Firm* — Green, Howard & Mughal LLP

(57) ABSTRACT

Techniques related to adaptive bitrate streaming for wireless video are discussed. Such techniques may include determining candidate bitrates for encoding segments of a source video. A minimum of the candidate bitrates may be selected and a segment of the source video may be encoded based on the selected encoding bitrate. The encoded bitstream may be transmitted wirelessly from a transmitting device to a receiving device, which may decode the bitstream and present the decoded video to a user.

24 Claims, 7 Drawing Sheets

500

Determine a First Candidate Bitrate for Encoding a Segment of a Source Video, Using a First Video Codec, as a Bitrate for the Source Video Encoded Using a Second Video Codec Modified by a Scaling Factor
501

Determine a Second Candidate Bitrate for Encoding the Segment of the Source Video, Using the First Video Codec, as an Average Bitrate for the Segment or a Previous Segment of the Source Video Encoded Using the First Video Codec
502

Determine a Third Candidate Bitrate for Encoding the Segment of the Source Video, Using the First Video Codec, as an Encoding Bitrate Prediction for the Segment or the Previous Segment Encoded Using the First Video Codec
503

Select an Encoding Bitrate for the Segment as a Minimum of the First, Second, and Third Candidate Bitrates
504

Encode, Using the First Video Codec, the Segment based on the Selected Encoding Bitrate
505

FIG. 5

ADAPTIVE BITRATE STREAMING FOR WIRELESS VIDEO

BACKGROUND

Streaming video content (e.g., content from the Internet, locally saved content, or the like) from a mobile device to a television via wireless display technology is becoming increasingly popular. For example, a Wi-Fi communications channel may be used to implement Wireless Display (WiDi) and/or Miracast technology to enable users to stream videos, movies, photos, or displayed content from a mobile device to a television.

In some implementations, wireless channel capacity may not be a bottleneck or concern when transmitting video content over a wireless channel. However, streaming video content at an unnecessarily high encoding bit rate via wireless channel may cause several problems such as wasting wireless bandwidth, causing interference in the environment of the transmission, and reducing the battery life of mobile device streaming the video content. In particular, the reduced battery life may be dramatic and may degrade the user experience for a user of the mobile device and/or television. In other implementations, wireless channel capacity may be a concern and streaming video content at a lower bitrate may be advantageous for the utilization of the wireless communications channel.

Current WiDi/Miracast solutions may set a fixed relatively high video encoding bitrate (e.g. an average encoding bit rate of about 9 megabits per second (Mbps) and a max encoding bit rate of about 12 Mbps for 1920×1080 resolution video) to guarantee the transmission will not degrade the quality of the source content (e.g., the content on the transmitting device) no matter what video content is streamed. Such techniques may cause short battery life during WiDi/Miracast video streaming. Solutions have been proposed to reduce the encoding bitrate, but such solutions may not ensure quality video or quality of user experience at the receiving display device (e.g., a television).

As such, existing techniques do not provide wireless streaming of video content with a reduced bitrate to enhance batter life at the transmitting device (e.g., a mobile device) and high quality video presentment at the receiving device (e.g., a television). Such problems may become critical as the desire to transmit video content from a transmitting device for presentment of high quality, aesthetically pleasing video content at a receiving device becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 is a flow diagram illustrating an example process for encoding video content for wireless transmission;

DETAILED DESCRIPTION

Figure 1:
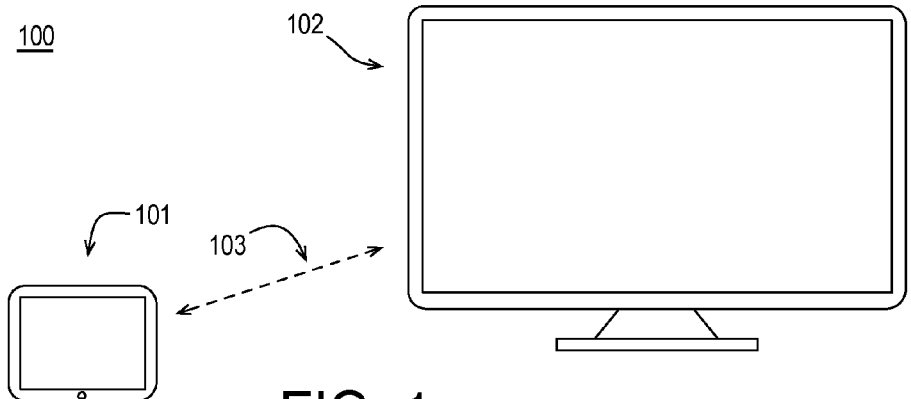
FIG. 1 is an illustrative diagram of an example system for wirelessly transmitting video content.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to encoding video content for wireless transmission and, in particular, to selecting an encoding bitrate for encoding the video content.

As described above, it may be advantageous to stream video content such as a source video (e.g., content from the Internet, locally saved content, or the like) from a mobile device to a television via wireless display technology. For example, such a system may provide users flexibility in presenting and sharing content. Also as discussed, some existing techniques may provide for fixed relatively high encoding bitrates that may decrease battery life at the transmitting device and/or cause overuse or strain on the wireless communications channel. Other existing techniques may reduce encoding bitrates at the cost of decreased video quality that reduces a user's experience.

In some embodiments discussed herein, encoding video content for wireless transmission may include determining multiple candidate bitrates for encoding a segment of source video. For example, the candidate bitrates may be candidate bitrates for encoding the source video based on a local codec (e.g., a local video codec used by the transmitting device for encoding and the receiving device for decoding). The local codec may be any suitable codec such as a codec based on the H.264/MPEG-4 Advanced Video Coding (AVC) standard or the High Efficiency Video Coding (HEVC) standard or the like. A minimum of the candidate bitrates may be selected for encoding the segment and the segment may be encoded based on the local video codec and the selected bitrate. The resultant encoded bitstream may be transmitted to a receiving device for decoding and eventual presentment to a user.

In some examples, a first candidate bitrate may be determined based on a bitrate of the source video modified by a scaling factor. For example, the source video may be a compressed source video that has been compressed based on a video codec associated with the source video. The video codec used to compress the source video may be any suitable codec such as MPEG-2, H.264/MPEG-4 AVC standard, the HEVC standard, the Audio Vide Standard (AVS), the Windows Media Video codec, or the like. For example, the local video codec and the video codec associated with the compression of the source video may be different. A bitrate associated with the compressed source video may be determined (e.g., via an application programming interface or the like) and the determined bitrate may be modified by a scaling factor to generate the first candidate bitrate. The scaling factor may be an adaptive scaling factor based on the video codec associated with the compressed source video and the local codec.

Furthermore, a second candidate bitrate may be determined based on an average bitrate for either the segment encoded using the local codec or a previously encoded segment (e.g., a previous segment in the source video encoded using the local codec). In some examples, a previously encoded segment may be used to generate a candidate bitrate for a subsequent segment (e.g., a current segment). Such examples may provide low latency and substantially real-time encoding bitrates for encoding and transmitting the source video. In other examples, the segment itself may be encoded (e.g., based on a prior target bitrate, a default bitrate, or based on another encoding parameter) and a candidate bitrate may be determined for the segment. In such examples, after determining a selected encoding bitrate from the candidate bitrates, the segment may be encoded (again) based on the selected bitrate. Such examples may provide for increased accuracy in selecting the encoding bitrate at the cost of potential latency issues in transmitting the video content to the receiving device.

In some examples, a third candidate bitrate may be determined based on an encoding bitrate prediction for the segment encoded using the local codec or a previously encoded segment (e.g., a previous segment in the source video encoded using the local codec). The encoding bitrate prediction may be based on the encoded bitstream of the segment or the previously encoded segment, a selected desired mean opinion score (MOS; e.g., a measure of a user's view of quality), selected minimum and maximum bitrate boundaries, and quality coefficients associated with the receiving device (e.g., based on the resolution of the receiving device or the like). The encoding bitrate prediction may provide a non-reference MOS based bitrate prediction for encoding the segment. As discussed with respect to the second candidate bitrate, the encoding bitrate prediction may be based on an encoding the segment itself or based on an encoding of a previous segment of the video content.

A selected encoding bitrate for the segment may be determined as a minimum of the first, second, and third candidate bitrates. Furthermore, the segment may be encoded using the local video codec and based on the selected encoding bitrate. The resultant bitstream may be wirelessly transmitted to a receiving device, which may decode the bitstream to generate video frames for presentment to a user. Such techniques may provide for reduced bitrates for transmitting the video content, which may save battery life at the transmitting device. Furthermore, the techniques discussed herein may provide for high quality video with a lower encoding bitrate and lower required wireless bandwidth and improve WiDi/Miracast performance robustness under interference, thereby improving the user's experience during video streaming.

FIG. 1 is an illustrative diagram of an example system 100 for wirelessly transmitting video content, arranged in accordance with at least some implementations of the present disclosure. As shown in FIG. 1, system 100 may include a transmitting device 101 and a receiving device 102 communicatively coupled via wireless communications channel 103. In some examples, transmitting device 101 may transmit, via wireless communications channel 103, encoded video data to receiving device 102. Receiving device 102 may receive the encoded video data, decode it to generate video frames or the like, and present the decoded video to a user. Although illustrated with a single transmitting device 101 and a single receiving device 102 communicating via a single wireless communications channel 103, any number or transmitting devices, receiving devices, and/or wireless communications channels may be employed in system 100.

In the illustrated example, transmitting device 101 is a tablet and receiving device 102 is a television. However, any combination of suitable devices may be implemented via system 100. For example, transmitting device 101 may include any suitable device such as a computer, a laptop, an ultrabook, a smartphones, a tablet, or the like. Furthermore, receiving device 102 may include any suitable device such as a television, a smart television, a computer, a laptop, an ultrabook, a smartphone, a tablet, or the like. In some examples, receiving device 102 may be a set-top box or a digital recorder or the like. In such examples, receiving device 102 may not include a display, but receiving device 102 may be coupled to a display for presentment of video content. In any case, transmitting device 101 and/or receiving device 102 may be described as a computing device as used herein. Furthermore, the video content transmitted from transmitting device 101 to receiving device 102 may include any suitable video content such as a video or other content downloaded to transmitting device 101 via the Internet or a local area network or the like, a video file or video container or other video content saved on a local memory of transmitting device, a streaming of video data or other images emulating the display of transmitting device 101 (e.g., receiving device 102 may mirror content displayed via transmitting device 101), photographs streamed from transmitting device 101 to receiving device 102, or the like. In some examples, receiving device 102 and transmitting device 101 may present the same content to a user or users and, in other examples, they may present different content.

Wireless communications channel 103 may be any suitable wireless link and communications may be facilitated via any suitable protocol(s) or standard(s). In some examples, wireless communications channel 103 is a Wi-Fi connection based on an Institute of Electrical and Electronics Engineers (IEEE) 802.11 standard such as 802.11a/b/g/n/ac/ad or the like. In other examples, wireless communications channel 103 may be based on an implementation of a Wi-Fi Multimedia (WMM) interoperability standard. In yet further examples, wireless communications channel 103 may provide communications based on wireless display (WiDi) technology and/or based on implementation of a wireless screen casting standard such as a Miracast standard using Wi-Fi direction connections. In an embodiment, wireless communications channel 103 is part of a wireless local area network (WLAN).

As discussed herein, it may be advantageous, even in instances where the bandwidth of wireless communications channel 103 is not a bottleneck or a concern, to limit the bitrate for transmitting video content from transmitting device 101 to receiving device 102. For example, such bandwidth limitation may preserve a battery life of transmitting device 101. Techniques discussed herein may reduce the bitrate of transmitted video while providing a desirable video quality and/or quality of experience (QoE) for a user of system 100.

For example, the techniques discussed herein may evaluate a source video's content information (e.g. bitrate, resolution, temporal complexity, or the like) and display information associated with receiving device 102 based on a non-reference (NR) mean opinion score (MOS) bitrate prediction tool or module to reduce the required video encoding bitrate differently for different video content while achieving a certain desired video quality.

Figure 2:
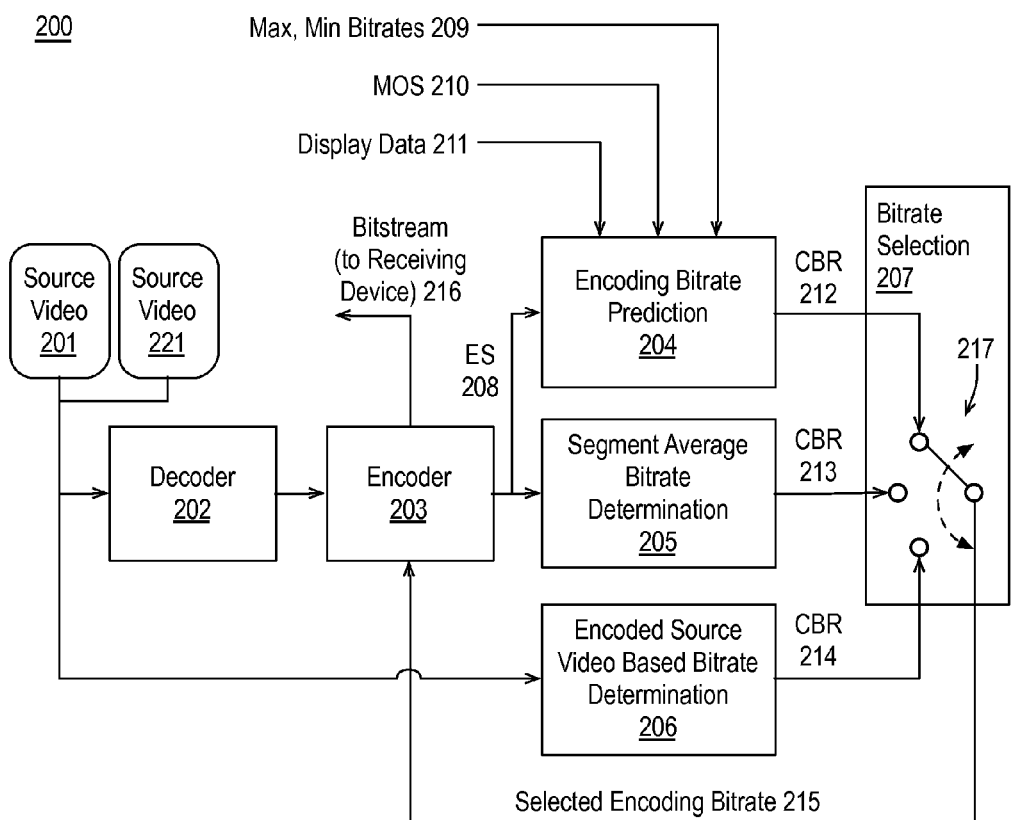
FIG. 2 illustrates an example system for encoding video content for wireless transmission.

FIG. 2 illustrates an example system 200 for encoding video content for wireless transmission, arranged in accordance with at least some implementations of the present disclosure. In some examples, system 200 may be implemented as a portion of transmitting device 101. As shown in FIG. 2, system 200 may include a decoder 202, an encoder 203, an encoding bitrate prediction module 204, a segment average bitrate determination module 205, an encoded source video based bitrate determination module 206, and a bitrate selection module 207. As shown, system 200 may receive, obtain or contain (e.g., via memory), source video 201. Also as shown, in some examples, system 200 may receive, obtain or contain multiple source videos including source video 201 and source video 221. Although illustrated with two source videos 201, 221, any number of source videos may be provided. As is discussed further herein, in some examples, source video 201 and source video 221 may have been compressed with different video codecs. Herein, the discussion of source video will use source video 201 for exemplary purposes; however, the discussed techniques may be used with source video 221 or the like. Source video 201 may include any suitable video content, such as those discussed herein, for transmission to receiving device 102 obtained via any suitable manner, such as downloading via the Internet, as saved in memory, via a video media device, or the like. As discussed, source video 201 may be compressed video content such that source video 201 was compressed via a video codec. The video codec used to compress source video 201 may be described as a video codec associated with the source video. In various examples, the video codec associated with the source video may be based on the H.264/MPEG-4 AVC standard, the HEVC standard, the Audio Vide Standard (AVS), the Windows Media Video codec, or any other suitable standard. In some examples, source video 201 may be a video file or a container or the like.

As shown, decoder 202 may receive source video 201 or a portion thereof. Decoder 202 may decode source video 201 based on the video codec associated with the source video and decoder 202 may transfer the decoded video content or a decoded portion of the video content to encoder 203. Encoder 203 may receive the decoded video content or the decoded portion of the video content. Encoder 203 may encode a segment of the decoded video content to generate encoded segment (ES) 208 (e.g., an encoded bitstream for the segment of source video 201). The segment of source video 201 may be any suitable portion of source video 201 having any number of frames such as 1 to 100 frames, 1 to 300 frames, or the like, or any time duration of source video 201 such as 1 to 3 seconds or the like. As discussed, encoder 203 may encode the decoded video content based on a local video codec (e.g., such that transmission of the video content may be based on the local video codec between transmitting device 101 and receiving device 102). The local video codec may be determined in any suitable manner such as a negotiation between transmitting device 101 and receiving device 102, a predetermined codec, a codec based on a standard (e.g., WiDi and/or Miracast), or the like. For example, decoder 202 may decode source video 201 based on a first video codec (e.g., a video codec associated with source video 201) and encoder 203 may encode the decoded video content (or a segment thereof) based on a second video codec (e.g., a local video codec). In such a manner, decoder 202 and encoder 203 may provide a transcoding of source video 201 from one compression format to another compression format. Furthermore, in some examples, encoded segment 208 may also be provided as a portion of bitstream 216 (e.g., as a portion of a resultant bitstream for transmission to receiving device 102).

Encoding bitrate prediction module 204 may receive encoded segment 208 (e.g., a bitstream for an encoded segment of source video 201), a maximum bitrate and a minimum bitrate (max, min bitrates) 209, a mean opinion score (MOS) 210, and display data 211. For example, maximum and minimum bitrates 209 may be preset by a compression and/or transmission standard or protocol, preset by a system developer, or heuristically determined by system 200, or the like. Maximum and minimum bitrates 209 may be any suitable bitrates that provide boundaries for transmission of quality video and limits on bandwidth used for transmission. For example, the maximum bitrate may be 10 Mbps, 15 Mbps, 20 Mbps, or the like, and the minimum bitrate may be 1 Mbps, 2 Mbps, 5 Mbps, or the like.

Furthermore, MOS 210 may be any suitable mean opinion score and may be preset by a compression and/or transmission standard or protocol, preset by a system developer, heuristically determined by system 200, or set by a user or the like. For example, a user may select a subjective quality selection (e.g., high, medium, or low quality) based on a user interface presented to the user such as a slider bar or the like, which may be translated to a MOS. For example, MOS 210 may be 3.5, 4.0, 4.5, or 5.0 or the like.

Display data 211 may be any suitable display data representative of a quality and/or resolution of a display of receiving device 102. In some examples, display data 211 may be one or more display quality coefficients based on the display of receiving device 102. For example, a request for display information may be transmitted from transmitting device 101 to receiving device 102 via wireless communications channel 103. Receiving device 102 may reply via wireless communications channel 103 to transmitting device 101 with display information including, for example, a resolution of the display, model numbers or other data associated with receiving device 102, or the like. In an embodiment, receiving device 102 may be a WiDi sink and the display information may be communicated via a real time streaming protocol (RTSP; e.g., a network control protocol designed for controlling streaming media devices). System 200 may receive the display information and may determine, using a look up table for example, display data 211. For example, display data 211 may include one or more receiving device dependent display quality coefficients. Such receiving device dependent display quality coefficients may approximate a display quality of receiving device 102, for example. In some examples, system 200 may receive such device dependent display quality coefficients directly from receiving device 102 (e.g., such that a local look up table or similar technique is not needed).

Encoding bitrate prediction module 204 may, based on encoded segment 208, maximum and minimum bitrates 209, MOS 210, and/or display data 211, determine an encoding bitrate prediction for either encoded segment 208 or a segment of source video 201 subsequent to encoded segment 208. The generated encoding bitrate prediction may be provided to bitrate selection module 207 as candidate bitrate (CBR) 212. In some examples, encoding bitrate prediction module 204 of system 200 may generate candidate bitrate 212 for a current segment of source video 201 based on a previously encoded segment of source video 201. In other examples, encoding bitrate prediction module 204 of system 200 may generate candidate bitrate 212 for a current segment of source video 201 based on a previous encoding of the current segment itself. In such examples, the current segment may be encoded (e.g., encoded a second time) based on a selected encoding bitrate (e.g., selected encoding bitrate 215). Such examples may provide for more accurate bitrate selection at the cost of potential latency in transferring portions of bitstream 216. In examples where candidate bitrate 212 for a current segment of source video 201 is based on a previously encoded segment, improved latency may be provided at the cost of potentially less accurate bitrate selection.

In either case, encoding bitrate prediction module 204 may determine candidate bitrate 212 based on a bitstream analysis of encoded segment 208 that may provide segment bitstream parameters such as, for example, an average bits per pixel of encoded segment 208, an average quantization parameter of encoded segment 208, an encoding frame rate of encoded segment 208, an encoding video height of encoded segment 208, or the like. Furthermore, candidate bitrate 212 may be based on the predetermined mean opinion score (e.g., MOS 210), the predetermined maximum and minimum bitrates (e.g., maximum and minimum bitrates 209), and the display quality coefficient(s) associated with receiving device 102 (e.g., display data 211). For example, a temporal complexity may be determined based on encoded segment 208 using any suitable techniques. The temporal complexity, the display data, and the segment bitstream parameters may be provided to a pre-trained bitrate prediction model, which may generate candidate bitrate 212. Details for an example determination of candidate bitrate 212 are discussed herein below with respect to FIG. 3.

Also as shown in FIG. 2, segment average bitrate determination module 205 may receive encoded segment 208. Segment average bitrate determination module 205 may determine an average bitrate for encoded segment 208 and may provide the average bitrate as candidate bitrate (CBR) 213 to bitrate selection module 207. In an embodiment, candidate bitrate 213 is the number of bits in encoded segment 208 divided by the playback time represented by encoded segment 208. In another embodiment, candidate bitrate 213 (e.g., the average bitrate for encoded segment 208) is the number of bits in encoded segment 208 divided by the number of pixels represented by encoded segment 208. As with respect to encoding bitrate prediction module 204, candidate bitrate 213 may be determined based on encoded segment 208 for a subsequent segment of source video 201 or for encoded segment 208 itself.

As shown, encoded source video based bitrate determination module 206 may receive source video 201 or a portion thereof. Encoded source video based bitrate determination module 206 may determine a candidate bitrate (CBR) 214 based on the received encoded source video 201. For example, encoded source video based bitrate determination module 206 may determine a bitrate for the encoded source video and modify the determined bitrate by a scaling factor to generate candidate bitrate 214. As discussed, the encoded source video (e.g., source video 201 or a portion thereof) may be encoded based on a video codec that is different than the video codec used to encode bitstream 216 for transmission to receiving device 102. In an example, the bitrate of the encoded source video may be determined by system 200 using an application programming interface that may access the encoded video content to determine its bitrate. The determined bitrate may be modified by a scaling factor (e.g., multiplied by a scaling factor). For example, the scaling factor may increase or decrease the determiend bitrate to determined candidate bitrate 214. The scaling factor may be any suitable scaling factor for determining candidate bitrate 214. In some examples, the scaling factor may be in the range of 50% to 75%, 75% to 125%, 90% to 100%, 125% to 150%, or 175% to 225% or the like.

In some examples, the scaling factor may be adaptive based on the codec associated with the encoded source video (e.g., the codec previously used to encode the compressed source video 201) and the codec used to encode bitstream 216 (e.g., the local codec used by the transmitting device 101 and the receiving device 102). In some examples, candidate bitrate 214 may provide a minimum bitrate required to encode source video 201, 221, such that the local video codec will produce equal or better quality than that of source video 201, 221. In some examples, the scaling factor may be determined based on a difference (e.g., a capability difference) between the codec previously used to encode the source video and the codec used to encode bitstream 216.

For example, if source video 201 has been compressed based on MPEG-2 at 12 Mbps, candidate bitrate 214 may only need to be 6 Mbps if the local codec is a H.264. In such examples (e.g., a source video codec of MPEG-2 and a local codec of H.264) the scaling factor may therefore be about 50% or 60% or the like. Such a scaling factor may be provided because the local codec, H.264 in this example, is more efficient codec than MPEG-2 with the same encoding features. Furthermore, if the local codec and the source video codec use the same codec, candidate bitrate 214 may still be modified based on, for example, different features used by the codecs. For example, a codec may enable I-frames only for archiving, I- and P-frames for real-time streaming, or I-, P-, and B-frames for high quality, or the like. For example, a source video compressed in H.264 at 6 Mbps with B-frames (e.g., I-, P-, and B-frames) may need a bitrate of about 12 Mbps for coding based on a local codec without B frames (e.g., either with I- and P-frames or I-frames only). In such an example, the scaling factor may therefore be about 200% or the like. Other combinations may be available. Using the techniques discussed herein, a candidate bitrate for source video 201 (e.g., candidate bitrate 214 in a first instance) and a candidate bitrate for source video 221 (e.g., candidate bitrate 214 in a second instance) may thereby be different. As such, the scaling factor may be adaptive based on the video codec used to compress source video such as source video 201, source video 221 or the like.

As shown in FIG. 2, bitrate selection module 207 may receive candidate bitrates 212, 213, 214 and bitrate selection module 207 may select selected encoding bitrate 215 for encoding a segment (e.g., either the segment associated with encoded segment 208 or a subsequent or different segment, as discussed). For example, bitrate selection module 207 may select a minimum bitrate from candidate bitrates 212, 213, 214 as selected encoding bitrate 215. In an embodiment, bitrate selection module 207 may select the minimum bitrate using a switch 217 as illustrated in FIG. 2. For example, switch 217 may be connected based on a minimum of candidate bitrates 212, 213, 214 to transmit the minimum as selected encoding bitrate 215.

Encoder 203 may receive selected encoding bitrate 215 and may encode decoded source video content based on selected encoding bitrate 215 to generate bitstream 216, which may be provided to receiving device 102. As discussed, receiving device 102 may receive bitstream 216 and receiving device 102 may decode bitstream 216 to generate video frames for presentment to a user. Encoder 203 may encode any portion of decoded source video content based on selected encoding bitrate 215. In an embodiment, encoder 203 may encode source video content associated with encoded segment 208 based on selected encoding bitrate 215. In another embodiment, encoder 203 may encode source video content associated with another segment of source video 201 based on selected encoding bitrate 215. For example, the segment encoded based on selected encoding bitrate 215 may be a subsequent segment with respect to encoded segment 208. In some embodiments, all of or a remainder of source video 201 may be encoded based on selected encoding bitrate 215.

Figure 3:
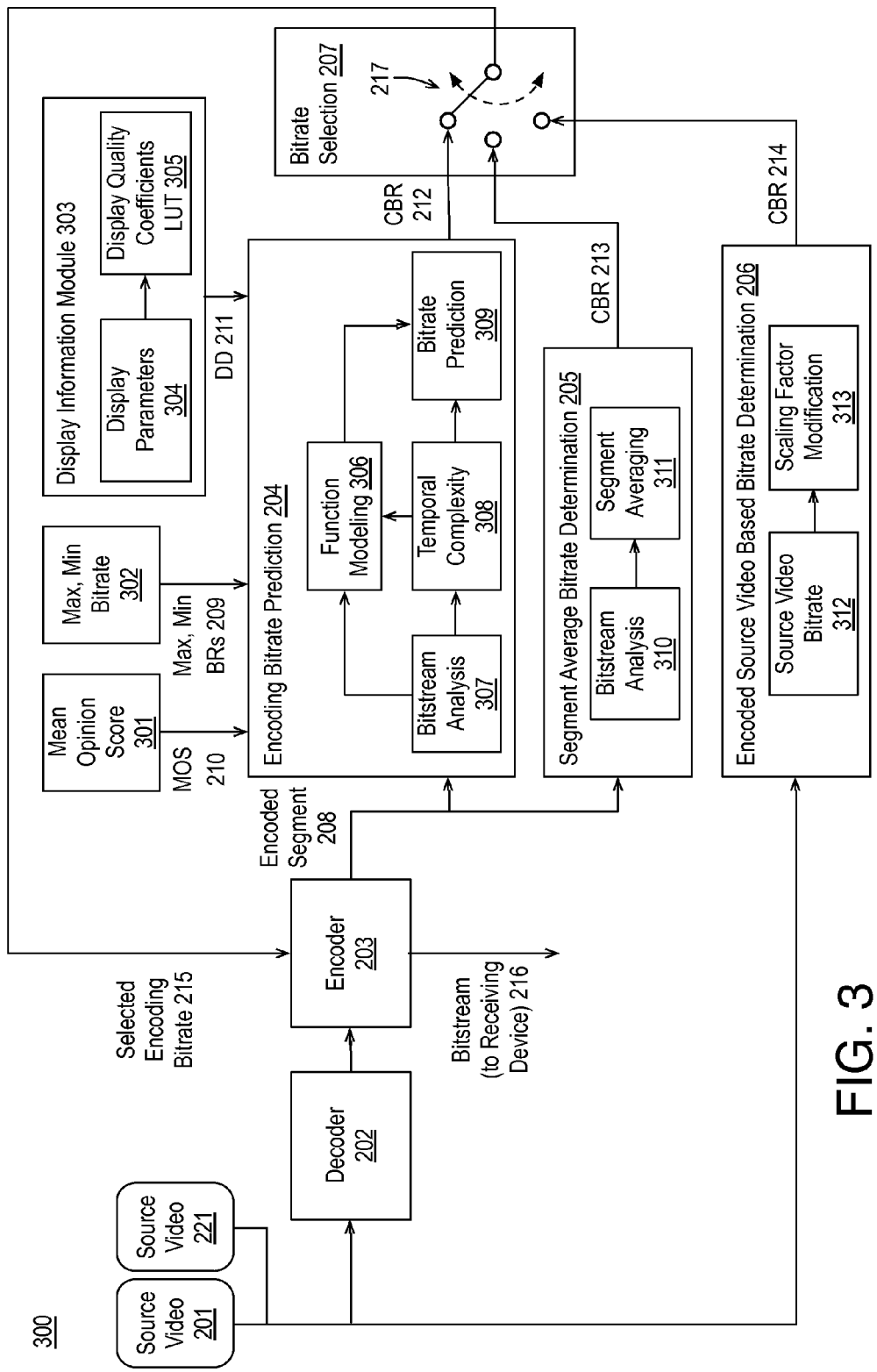
FIG. 3 illustrates an example system for encoding video content for wireless transmission.

FIG. 3 illustrates an example system 300 for encoding video content for wireless transmission, arranged in accordance with at least some implementations of the present disclosure. In some examples, system 300 may be implemented as a portion of transmitting device 101. As shown in FIG. 3, system 300 may include decoder 202, encoder 203, encoding bitrate prediction module 204, segment average bitrate determination module 205, encoded source video based bitrate determination module 206, bitrate selection module 207, a mean opinion score module 301, a maximum and minimum bitrate module 302, and a display information module 303. Furthermore, display information module 303 may include a display parameters module 304 and a display quality coefficients look up table (LUT) 305, encoding bitrate prediction module may include a function modeling module 306, a bitstream analysis module 307, a temporal complexity module 308, and a bitrate prediction module 309, segment average bitrate determination module 205 may include a bitstream analysis module 310 and a segment averaging module 311, and encoded source video based bitrate determination module 206 may include a source video bitrate module and a scaling factor modification module 313.

As shown, decoder 202 may receive source video 201 and/or source video 221 or a portion or portions thereof and decoder 202 may decode source video 201 based on the video codec associated with the source video and transfer the decoded video content or a decoded portion of the video content to encoder 203. Encoder 203 may receive the decoded video content or the decoded portion of the video content and encoder 203 may encode a segment of the decoded video content to generate encoded segment (ES) 208. Details associated with source video 201, source video 221, decoder 202, encoder 203, and encoded segment 208 have been discussed with respect to FIG. 2 and will not be repeated for the sake of brevity.

Also as shown, mean opinion score module 301 may determine, store, and/or transmit MOS 210, which may include any suitable information as discussed herein. For example, mean opinion score module 301 may provide functionality (e.g., via an application programming interface or the like) for a system developer and/or a user to adjust MOS 210 and/or a memory for storing a current MOS. Similarly, maximum and minimum bitrate (max, min bitrate) module 302 may determine, store, and/or transmit maximum and minimum bitrates (max, min BRs) 209, which may include any suitable information as discussed herein. For example, maximum and minimum bitrate module may provide functionality (e.g., via an application programming interface or the like) for a system developer and/or a user to adjust maximum and minimum bitrates 209 and/or a memory for storing a maximum and minimum bitrates (max, min BRs) 209.

Display information module may determine and/or generate display data (DD) 211 as shown. For example, display parameters module 304 may obtain display parameters or information (e.g., resolution information) from receiving device 102. In an embodiment, receiving device 102 is a WiDi sink and the display parameters may be communicated from receiving device 102 via a real time streaming protocol (RTSP). The display parameters may be transferred to display quality coefficients LUT 305, which may determine receiving device dependent coefficients based on the display parameters. For example, the coefficients may indicate a quality associated with the display of (or associated with) receiving device 102. In an embodiment, the quality coefficients include two coefficients for use by encoding bitrate prediction module 204 for the generation of candidate bitrate 212, as is discussed further herein. In some examples, the quality coefficients may be received directly from receiving device 102 and, in such examples, display quality coefficients LUT 305 may not be needed.

As shown, bitstream analysis module 307 of encoding bitrate prediction module 204 may receive encoded segment 208 (e.g., the encoded bitstream for a segment of source video 201). Bitstream analysis module 307 may determine segment bitstream parameters associated with encoded segment 208. For example, the segment bitstream parameters may include average bits per pixel, average quantization parameter, encoding frame rate, or encoding video height. In some examples, the segment bitstream parameters may be frame size data, frame type data, frame resolution data, or bitrate data. Bitstream analysis module 307 may transfer the segment bitstream parameters to function modeling module 306 and temporal complexity module 308.

Temporal complexity module 308 may determine a temporal complexity associated with encoded segment 208 based at least in part on the received segment bitstream parameters. Temporal complexity module 308 may determine the temporal complexity using any suitable technique or techniques. For example, the temporal complexity may be based on Equation (1) as follows:

$$TC = f_{TC}(\text{f\_parameters}) = \frac{\text{mean}(\text{Bits}_P)}{SF \times c^{\text{mean}(QP_P)}} \times \frac{fps}{\text{f\_h}} \quad (1)$$

where TC may be the temporal complexity, $f_{TC}$ may a function for determining TC, f_parameters may be the segment bitstream parameters, mean(Bits$_P$) may be the average bits per pixel, SF may be a scaling factor of about 40, c may be a constant of about 0.87, mean(QP$_P$) may be the average quantization parameter, fps may be the encoding frame rate, and f_h may be the encoding video height. Although described with respect to video height, f_h, other information or data associated with video or frame size may be used. In various examples, video height, video width, video aspect ratio, or combinations thereof may be used.

As shown, the temporal complexity may be transferred to function modeling module 306 and bitrate prediction module 309. Function modeling module 306 may provide a content (e.g., source video via the segment bitstream parameters and temporal complexity) and device (e.g., receiving device 102 via display data 211) based model to predict a video bitrate. For example, the model may be a pre-trained linear and/or non-linear model. For example, a training of the model may be provided as a non-linear fit of parameters based on a training set of video clips as shown in Equation (2) and/or as a linear fit as shown in Equation (3) and based on a test as shown in Equation (4):

$$v_i = \text{nonlinearfit}(\text{bitrate}, \text{MOS}), i=4,5 \quad (2)$$

where v may be parameters or function modeling coefficients to predict encoding bitrate, bitrate may be the bitrate of a training video clip, and MOS may be the mean opinion score of the training video clip.

$$(a,b)_{v_i} = \text{linearfit}(TC_{training}, v_i), v_i = a \times TC_{training} + b \quad (3)$$

where a and b may be slope and y-intercept corresponding to $v_i$ respectively and $TC_{training}$ may be the temporal complexity of the training set.

$$v_{i\_test} = a \times TC_{test} + b \quad (4)$$

where $v_{i\_test}$ may be a predicted $v_i$ for input test video.

In some examples, the training of function modeling module 306 may be performed offline (e.g., prior to a run-time with respect to source video 201) and function modeling module 306 may be saved via memory for implementation. As shown, bitrate prediction module 306 may receive parameters from function modeling module 306 and the temporal complexity from temporal complexity module 308. Bitrate prediction module 306 may determine candidate bitrate 212 based on an encoding bitrate prediction using any suitable technique or techniques. In an example, bitrate prediction module 306 may determine candidate bitrate 212 based on an encoding bitrate prediction determined by Equation (5) as follows:

$$e\_bitrate = \max\left(\min\left(v_4\left(\frac{1}{1-\frac{\text{desired\_MOS}-1}{b}}-1\right)^{\frac{1}{v_5}}, b\_\max\right), b\_\min\right) \quad (5)$$

where e_bitrate may be the encoding bitrate prediction, desired_MOS may be MOS 210, b_max and b_min may be maximum and minimum bitrates, respectively from maximum and minimum bitrates 209, and b may be a constant of about 3.7.

As shown in FIG. 3 and as discussed herein, the encoding bitrate prediction as described may be provided to bitrate selection module 207 as candidate bitrate 212.

Furthermore, bitstream analysis module 310 of segment average bitrate determination module 205 may receive encoded segment 208 as shown. Bitstream analysis module 310 may determine an average bitrate for encoded segment 208 and/or a average bits per pixel for encoded segment 208. Furthermore, segment averaging module 311 may determine an average bitrate for encoded segment 208. In some examples, bitstream analysis modules 307, 310 may be implemented separately (as shown) and, in other examples, they may be implemented together. Furthermore, in some examples, segment averaging module 311 may be eliminated and the discussed averaging may be provided by bitstream analysis module 310.

As discussed, in some examples, candidate bitrate 213 may be provided as an average bitrate for encoded segment 208. In such examples, bitstream analysis module 310 or segment averaging module 311 may provide the average bitrate (and the other module may be eliminated if desired). In other examples, one of candidate bitrate 212 or candidate bitrate 213 may be eliminated (prior to reaching bitrate selection module 207) based on a thresholding performed by bitstream analysis module 307 and/or bitstream analysis module 310. For example, an average bits per pixel may be determined for encoded segment 208. The average bits per pixel may be compared to a threshold to determine whether candidate bitrate 212 or candidate bitrate 213 may be provided to bitrate selection module 207. For example, if the average bits per pixel is greater than (or equal to) the threshold, candidate bitrate 212 may be provided (and candidate bitrate 213 may be eliminated) and, if the average bits per pixel is less than (or equal to) the threshold, candidate bitrate 212 may be provided (and candidate bitrate 213 may be eliminated). In such examples, bitrate selection module 207 may, for a particular segment, select between two candidate bitrates (e.g., candidate bitrate 214 and one of candidate bitrate 212 or candidate bitrate 213) and not three as illustrated in FIG. 3. Such techniques are discussed further herein with respect to FIG. 4.

As shown in FIG. 3, source video bitrate module 312 of encoded source video bitrate determination module 206 may receive source video 201 or portion thereof. For example, encoded source video bitrate determination module 206 may receive a compressed (e.g., encoded) source video such that the source video was compressed based on a video codec associated with source video 201 (e.g., prior to download, at the time of storing into memory, at the time of capture, or the like; and different than the video codec used by encoder 203 or the same as the video codec used by encoder 203 but with different features implemented). Source video bitrate module 312 may determine a bitrate of the compressed source video based on an average bitrate or the like. Source video bitrate module 312 may transfer the determined bitrate of the compressed source video to scaling factor modification module 313. Scaling factor modification module 313 may modify the determined bitrate by a scaling factor as discussed herein. For example, the scaling factor may be based on a difference between the codec used to compress the compressed source video and the local codec used to encode bitstream 216. As discussed, the scaling factor may thereby be adaptive based on the quality of the codec used to compress the compressed source video and/or the quality of the local codec used to encode bitstream 216. For example, two source videos compressed using different codecs may have different scaling factors as determined by scaling factor modification module 313. The determined bitrate may be modified by the scaling factor in any suitable manner. In an embodiment, the scaling factor (either positive or negative in this example) is added to the determined bitrate. In another embodiment, the scaling factor is multiplied by the determined bitrate (e.g., the determined bitrate is modified by x % where x is the scaling factor).

Bitrate selection module 207 may receive candidate bitrates 212, 213, 214 or candidate bitrate 214 and one of candidate bitrates 212, 213 (as discussed) and bitrate selection module 207 may determine selected encoding bitrate 215 for encoding a segment of source video 201 (e.g., for encoding a decoded segment of video content such that the segment is either the same as the segment represented by encoded segment 208 or different than the segment represented by encoded segment 208). For example, bitrate selection module 207 may select a minimum bitrate of the received candidate bitrates as selected encoding bitrate 215. In an embodiment, bitrate selection module 207 may select a minimum bitrate based on switch 215 as discussed herein.

Encoder 203 may receive selected encoding bitrate 215 and may encode source video 201 (e.g., decoded video content based on selected encoding bitrate 215) to generate bitstream 216, which may be provided to receiving device 102. As discussed bitstream 216 may be encoded using a local video codec. The local video codec may be determined based on a standard, a negotiation between transmitting device 101 and receiving device 102 or the like. Receiving device 102 may receive bitstream 216 and decode bitstream 216 to generate video frames for presentment to a user. Encoder 203 may encode any portion of decoded video content based on selected encoding bitrate 215. In an embodiment, encoder 203 may encode video content associated with encoded segment 208 based on selected encoding bitrate 215. In another embodiment, encoder 203 may encode video content associated with another segment of source video 201 based on selected encoding bitrate 215. For example, the segment encoded based on selected encoding bitrate 215 may be a subsequent segment with respect to encoded segment 208. In some embodiments, all of or a remainder of source video 201 may be encoded based on selected encoding bitrate 215.

Figure 4:
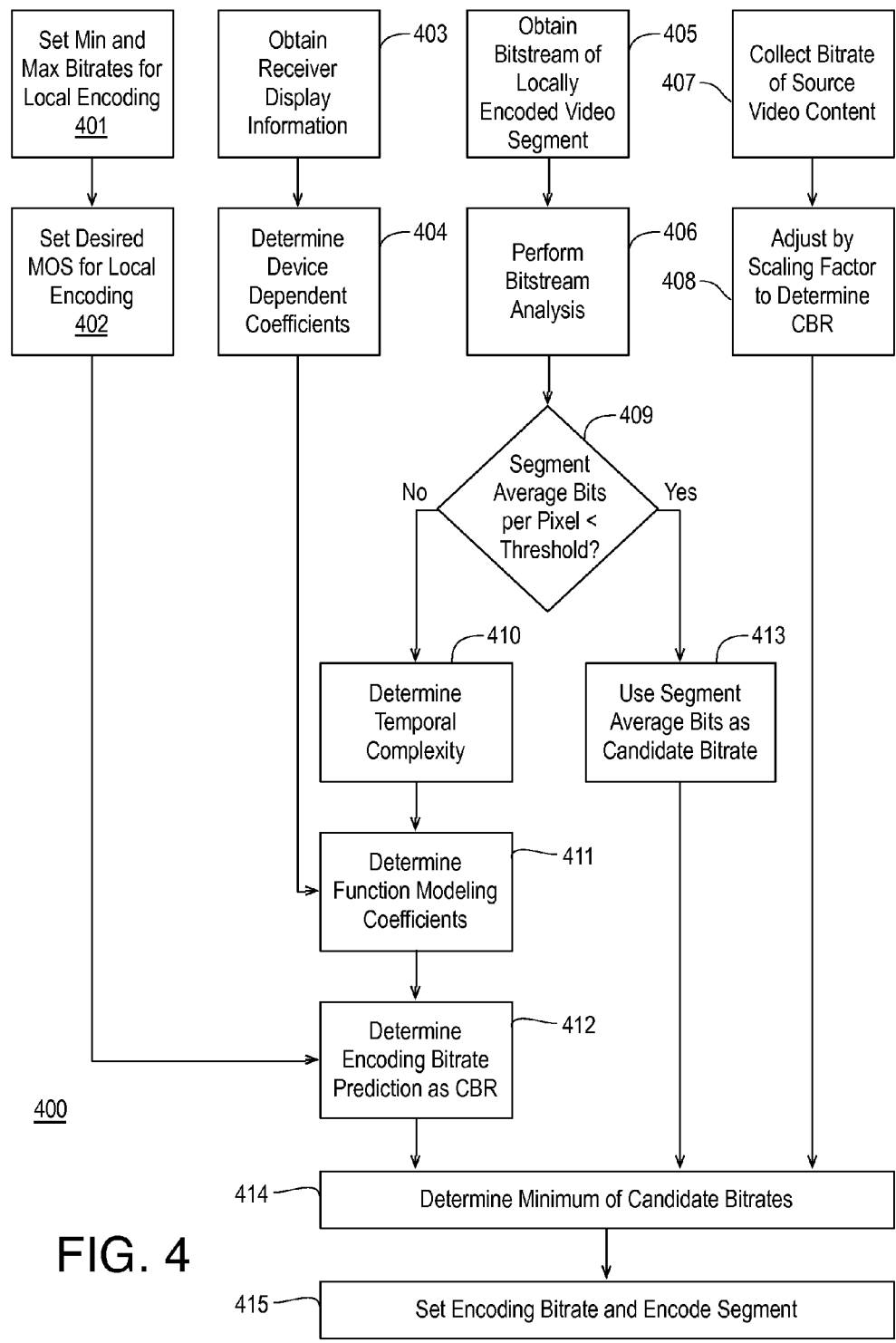
FIG. 4 is a flow diagram illustrating an example process for encoding video content for wireless transmission.

FIG. 4 is a flow diagram illustrating an example process 400 for encoding video content for wireless transmission, arranged in accordance with at least some implementations of the present disclosure. Process 400 may include one or more operations 401-415 as illustrated in FIG. 4. Process 400 may form at least part of a video encoding process. By way of non-limiting example, process 400 may form at least part of a video encoding process video content as undertaken by devices 101 or 800 or systems 200, 300, 600, or 700 as discussed herein.

In some examples, process 400 may be implemented even when a wireless channel capacity is not a bottleneck or concern. Furthermore, process 400 may be based on the non-reference (NR) bitrate predictor (e.g., encoding bitrate prediction module 204), In some examples, encoding bitrate prediction may be skipped or bypassed when the segment average bit per pixel is below a specific threshold (e.g., as discussed with respect to decision operation 409). In other examples, the encoding bitrate prediction and the segment average bitrate may be provided for selection as discussed with respect to candidate bitrates 212 and 213. In such examples, when bypass would have occurred (such that only candidate bitrate 213 would be provided), candidate bitrate 213 would likely (or necessarily) be less than candidate 212 such that a bypass or determining both provides the same result. Such a bypass and/or determination of a segment average bitrate may provide for improved bitrate predictions in instances where the encoding bitrate prediction may have limitations such as, for example, in evaluating segments consisting of static frames with extremely small number of bits (e.g. black and white frames).

Furthermore, as discussed, an encoded source video based bitrate determination may be made based on a bitrate of compressed source video modified by a scaling factor. Such techniques may be advantageous when source video 201 is either Internet video content having a relatively low video quality or local video content having relatively high video quality (e.g., low or high quality as compared to H.264 AVC or HEVC quality). For both cases, the achievable video quality bitstream 216 (e.g., encoded video for transmission) is determined largely by the bitrate and resolution of source video 201. If source video 201 has high bitrate and higher MOS than the desired MOS (e.g., MOS 210), the discussed encoding NR MOS bitrate prediction may be used to reduce the encoding bitrate significantly. However, if source video 201 has a low or very low bitrate, then using a high encoder bitrate (e.g., selected encoding bitrate 215) may be wasteful and would not improve MOS of the presentment of video at receiving device 102. In such instances, as discussed, a scaling factor (e.g., modifying the bitrate of the source video by a scaling factor) may be used to determine the bitrate for encoding (e.g., selected encoding bitrate 215). For example, the scaling factor (e.g., x) may be adaptively adjusted based on the source and local codec performance difference as discussed.

Returning to FIG. 4, process 400 may begin at operation 401, "Set Min and Max Bitrates for Local Encoding", where a minimum bitrate and a maximum bitrate may be set or determined as discussed herein. For example, maximum and minimum bitrates 209 may be set or determined via maximum and minimum bitrate module 302 of system 300.

Process 400 may continue at operation 402, "Set Desired MOS for Local Encoding", where a desired mean opinion score (MOS) may be set or determined as discussed herein. For example, mean opinion score 210 may be set or determined via mean opinion score module 301.

Process 400 may continue at operation 403, "Obtain Receiver Display Information", where display information for a receiver (e.g., receiving device 102) may be obtained or received as discussed herein. For example, display parameters module 304 of display information module 303 may obtain or receive display information (e.g., display resolution information) for receiving device 102.

Process 400 may continue at operation 404, "Determine Device Dependent Coefficients", where device dependent coefficients such as display quality coefficients may be determined as discussed herein. For example, display data 211 including display quality coefficients may be determined via display quality coefficients look up table 305 of display information module 303.

Process 400 may continue at operation 405, "Obtain Bitstream of Locally Encoded Video Segment", where a bitstream of a locally encoded video segment may be obtained and/or determined as discussed herein. For example, decoder 202 may decode a segment of source video 201 (based on a video codec associated with the compressed source video) and encoder 203 may encode the segment based on a local video codec as discussed.

Process 400 may continue at operation 406, "Perform Bitstream Analysis", where a bitstream analysis may be performed based on the bitstream associated with the segment of video as discussed herein. For example, bitstream analysis module 307 of encoding bitrate prediction module 204 may perform a bitstream analysis based on encoded segment 208 to generate segment bitstream parameters including an average bits per pixel of the segment, an average quantization parameter of the segment, an encoding frame rate of the segment, or an encoding video height of the segment.

Process 400 may continue at operation 407, "Collect Bitrate of Source Video Content", where a bitrate of source video content may be collected or determined as discussed herein. For example, source video bitrate module 312 of encoded source video based bitrate determination module 206 may receive source video 201 (e.g., compressed source video) or a portion thereof and source video bitrate module 312 may determine a bitrate for the source video encoded using the video codec associated with the compression of the source video.

Process 400 may continue at operation 408, "Adjust by Scaling Factor to Determine CBR", where the bitrate for the compressed source video may be adjusted by a scaling factor as discussed herein. For example, scaling factor modification module 313 of encoded source video based bitrate determination module 206 may modify the bitrate by a scaling factor to generate candidate bitrate 214. As discussed, the scaling factor may be adaptive based on the video codec associated with the compression of the source video.

Process 400 may continue from operation 406 as discussed at decision operation 409, "Segment Average Bits per Pixel<Threshold?", where an average bits per pixel of the segment may be compared to a threshold. As shown, if the average bits per pixel for the segment are less than a threshold (or less than or equal to in some implementations), process 400 may continue at operation 410 and, if the average bits per pixel for the segment are greater than or equal to the threshold (or greater than in some implementations), process 400 may continue at operation 413.

Process 400 may continue thereby at operation 410, "Determine Temporal Complexity", where a temporal complexity for the segment may be determined as discussed herein. For example, temporal complexity module 308 of encoding bitrate prediction module 204 may determine the temporal complexity based on Equation (1) or the like.

Process 400 may continue at operation 411, "Determine Function Modeling Coefficients", where function modeling coefficients may be determined based on the device dependent coefficients determined via operation 404 and the temporal complexity determined via operation 410. For example, the function modeling coefficients may provide coefficients for a pre-trained bitrate prediction model, which may generate a bitrate prediction dependent upon the content of the segment (e.g., the temporal complexity) and a quality of the receiver display (e.g., the device dependent quality coefficients).

Process 400 may continue at operation 412, "Determine Encoding Bitrate Prediction as CBR", where an encoding bitrate prediction may be determined based on the function modeling coefficients determined via operation 411, the minimum and maximum bitrates determined via operation 401, and the desired MOS determined via operation 402. For example, bitrate prediction module 309 of encoding bitrate prediction module 204 may determine candidate bitrate 212 based on Equation (5) or the like.

As discussed, in examples where the segment average bits per pixel are less than a threshold (or less than or equal to the threshold) process 400 may continue from decision operation 409 to operation 413, "Use Segment Average Bits as CBR", where the average bits of the segment (or an average bitrate for the segment) may be used as the candidate bitrate. As discussed, in some examples, decision operation 409 and operation 413 may provide a bypass or a skip of operations 410-412. For example, such a bypass may occur when the segment average bits per pixel are less than a threshold (or less than or equal to the threshold). In such examples, the discussed encoding bitrate prediction model may not provide useful results such as in low or very low bitrate scenarios (e.g., segments of static black and white frames or the like). For example, segment averaging module 311 or bitstream analysis module 310 may provide candidate bitrate 213 as the average bits of the segment.

Process 400 may continue at operation 414, "Determine Minimum of Candidate Bitrates", where a minimum of the candidate bitrates may be determined. For example, bitrate selection module 207 may determine a minimum of the candidate bitrates. As discussed, in the example of process 400, operation 414 may be used to select the minimum of the candidate bitrate provided by operation 408 and either a candidate bitrate provided by operation 412 or a candidate bitrate provided by operation 413 (depending on the decision at decision operation 409). Such a bypass implementation may provide less computations and faster processing times for example.

In other embodiments as discussed herein, decision operation 409 may be bypassed and both a candidate bitrate provided by operation 412 and a candidate bitrate provided by operation 413 (along with a candidate bitrate provided by operation 408) may be provided for the determination of a minimum of the candidate bitrates at operation 414.

Process 400 may continue at operation 415, "Set Encoding Bitrate and Encode Segment", where an encoding bitrate may be set and a segment may be encoded. For example, bitrate selection module 207 may set selected encoding bitrate 215 for encoder 203 to encode a segment of (decoded) source video 201. As discussed, in some examples, the selected bitrate may be used to encode a subsequent segment to the segment currently being evaluated and, in other examples, the selected bitrate may be used to encode the current segment currently itself.

The operations of process 400 may be repeated any number of times either in series or in parallel for any number of segments of a source video and/or for any number of source videos. As discussed, various source videos may have been compressed using different video codecs, which may influence the scaling factor implemented via operation 408.

FIG. 5 is a flow diagram illustrating an example process 500 for encoding video content for wireless transmission, arranged in accordance with at least some implementations of the present disclosure. Process 500 may include one or more operations 501-505 as illustrated in FIG. 5. Process 500 may form at least part of a video encoding process. By way of non-limiting example, process 500 may form at least part of a video encoding process as undertaken by devices 101 or 800 or systems 200, 300, 600, or 700 as discussed herein. Furthermore, process 500 will be described herein in reference to system 600 of FIG. 6.

Figure 6:
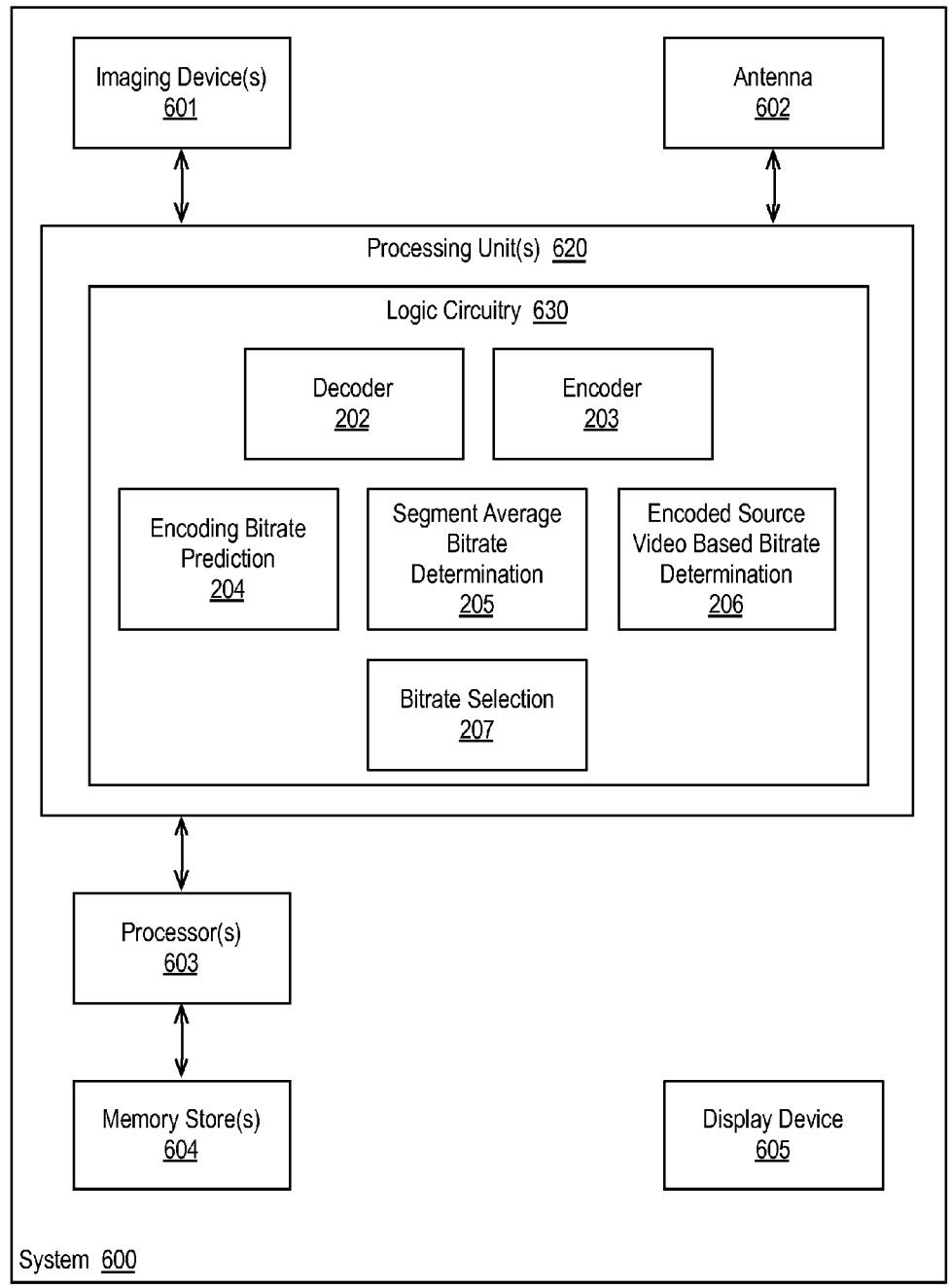
FIG. 6 is an illustrative diagram of an example system.

FIG. 6 is an illustrative diagram of an example system 600, arranged in accordance with at least some implementations of the present disclosure. For example, system 600 may be a video coding system of device 101 or the like. As shown in FIG. 6, system 600 may include one or more imaging devices 602, an antenna 602, one or more processing units 620 including logic circuitry 630, one or more processors 603, one or more memory stores 604, and a display device 605. Furthermore, logic circuitry 630 may include decoder 202, decoder 202, encoding bitstream prediction module 205, segment average bitrate determination module 205, encoded source video based bitrate determination module 206, and bitrate selection module 207. As illustrated, imaging device(s) 601, antenna 602, processing unit(s) 620, logic circuitry 630, decoder 202, decoder 202, processor(s) 603, memory store(s) 604, and/or display device 605 may be capable of communication with one another.

As shown, in some examples, system 600 may include antenna 602. Antenna 602 may be configured to transmit or receive an encoded bitstream of video data, for example. Further, in some examples, system 600 may include display device 605. Display device 605 may be configured to present video data such decoded source video 201. As shown, in some example, logic circuitry 630 may be implemented via processing unit(s) 620. Processing unit(s) 620 may include application-specific integrated circuit (ASIC) logic, graphics processor(s), general purpose processor(s), or the like. System 600 also may include optional processor(s) 603, which may similarly include application-specific integrated circuit (ASIC) logic, graphics processor(s), general purpose processor(s), or the like. In some examples, logic circuitry 630 may be implemented via hardware, video coding dedicated hardware, or the like, and processor(s) 603 may implement general purpose software, operating systems, or the like, via, for example, a multi-core central processing unit (CPU). In addition, memory store(s) 604 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 604 may be implemented by cache memory. In some examples, logic circuitry 630 may access memory store(s) 604 (for implementation of a video frame buffer for example). In other examples, logic circuitry 630 and/or processing unit(s) 620 may include memory stores (e.g., cache or the like) for the implementation of a video frame buffer or the like. For example, memory store(s) 604 may store any video data such as source video 201 (e.g., compressed source video), decoded source video, encoded segment 208, bitstream 216, candidate bitrates 212, 213, 214, maximum and minimum bitrates 209, MOS 210, display data 211, selected encoding bitrate 215, or any other data utilized or generated as discussed herein.

In some examples, encoder 100 implemented via logic circuitry 630 may include a frame buffer (e.g., via either processing unit(s) 620 or memory store(s) 604) and a graphics processing unit (e.g., via processing unit(s) 620). The graphics processing unit may be communicatively coupled to the frame buffer for example. The graphics processing unit may include encoder 100 as implemented via logic circuitry 630 and/or the various modules as discussed herein. For example, the graphics processing unit may include decoder 202, decoder 202, encoding bitstream prediction module 205, segment average bitrate determination module 205, encoded source video based bitrate determination module 206, and bitrate selection module 207 as shown. The illustrated modules may be implemented to perform any of the operations as discussed herein.

In some examples, antenna 602 of system 2000 may be configured to transmit an encoded bitstream of video data such as bitstream 216. As discussed, the encoded bitstream may include video data encoded using a local codec such as the H.264 AVC codec or the HEVC codec or the like.

Returning to discussion of FIG. 5, process 500 may begin at operation 501, "Determine a First Candidate Bitrate for Encoding a Segment of a Source Video, Using a First Video Codec, as a Bitrate for the Source Video Encoded Using a Second Video Codec Modified by a Scaling Factor", where a first candidate bitrate for encoding a segment of a source video, using a first video codec, may be determined such that the first candidate bitrate is a bitrate for the source video encoded using a second video codec modified by a scaling factor. For example, encoded source video based bitrate determination module 206 as implemented via logic circuitry 630 may receive a compressed source video or a portion thereof such that the compression was performed using a codec associated with a compression of the source video (e.g., the second video codec) and encoded source video based bitrate determination module 206 may determine the bitrate for the compressed source video and modify it by a scaling factor as discussed herein to generate the first candidate bitrate. The first bitrate may be determined for encoding the segment using a local video codec (e.g., the first video codec). For example, the scaling factor may be based on a quality of the video codec associated the compression of the source video such that, for a greater quality difference between the video codecs, a larger scaling factor may be used.

For example, a candidate bitrate may be determined for encoding, using the first video codec, a second segment of a second source video such that the candidate bitrate comprises a bitrate for the second source video encoded using a third video codec modified by a second scaling factor. In an embodiment, if the second video codec and the third video codec are different, the determined scaling factors are also different. For example, when wherein a first quality difference between the first video codec and the second video codec is greater than a second quality difference between the first video codec and the third video codec, the scaling factor for the segment encoded using the second video codec is greater than the scaling factor for the segment encoded using the third video codec.

Processing may continue at operation 502, "Determine a Second Candidate Bitrate for Encoding the Segment of the Source Video, Using the First Video Codec, as an Average Bitrate for the Segment or a Previous Segment of the Source Video Encoded Using the First Video Codec", where a second candidate bitrate for encoding the segment of the source video, using the first video codec, may be determined such that the second candidate bitrate is an average bitrate for at least one of the segment of the source video encoded using the first video codec or a previous segment of the source video encoded using the first video codec. In an embodiment, the previous segment is used and the previous segment is immediately prior to the segment in the source video. For example, segment average bitrate determination module 205 as implemented via logic circuitry 630 may receive a segment encoded using a local codec (e.g., the first video codec) and segment average bitrate determination module 205 as implemented via logic circuitry 630 may determine an average bitrate based on the received encoded segment as the second candidate bitrate.

Processing may continue at operation 503, "Determine a Third Candidate Bitrate for Encoding the Segment of the Source Video, Using the First Video Codec, as an Encoding Bitrate Prediction for the Segment or the Previous Segment Encoded Using the First Video Codec", where a third candidate bitrate for encoding the segment of the source video, using the first video codec, may be determined such that the third candidate bitrate is an encoding bitrate prediction for at least one of the segment encoded using the first video codec or the previous segment encoded using the first video codec. For example, encoding bitrate prediction module 204 as implemented via logic circuitry 630 may receive a segment encoded using a local codec (e.g., the first video codec) and encoding bitrate prediction module 204 as implemented via logic circuitry 630 may determine a bitrate prediction based on the encoded segment and/or other data to determine the third candidate bitrate as the encoding bitrate predication. For example, the encoding bitrate prediction may be based at least in part on one of a predetermined mean opinion score, a predetermined maximum bitrate, a predetermined minimum bitrate, or a display quality coefficient associated with a receiving device of the wireless transmission as discussed herein.

In some examples, determining the encoding bitrate prediction may include analyzing a bitstream of the segment encoded using the first video codec or the previous segment encoded using the first video codec to determine segment bitstream parameters, determining a temporal complexity based on the segment bitstream parameters, and generating a bitrate prediction based on the temporal complexity and a pre-trained bitrate prediction model. In an embodiment, the segment bitstream parameters include at least one of an average bits per pixel of the segment, an average quantization parameter of the segment, an encoding frame rate of the segment, or an encoding video height of the segment. In some examples, the bitrate prediction is further based on a predetermined mean opinion score, a predetermined maximum bitrate, a predetermined minimum bitrate, and a display quality coefficient associated with a receiving device of the wireless transmission as discussed herein. For example, the display quality coefficient associated with the receiving device may be determined using a look up table based on resolution information received from the receiving device.

Processing may continue at operation 504, "Select an Encoding Bitrate for the Segment as a Minimum of the First, Second, and Third Candidate Bitrates", where an encoding bitrate for the segment of the source video may be selected as a minimum of the first, second, and third candidate bitrates. For example, bitrate selection module 207 as implemented via logic circuitry 630 may receive the first, second, and third candidate bitrates and select a minimum of them as a selected encoding bitrate. As discussed, in some examples, bitrate selection module 207 as implemented via logic circuitry 630 may receive three candidate bitrates. In other examples, either the second or third candidate bitrates may be bypassed and bitrate selection module 207 as implemented via logic circuitry 630 may select a minimum of the first candidate bitrate and either the second or third candidate bitrates for providing the selected encoding bitrate.

Processing may continue at operation 505, "Encode, Using the First Video Codec, the Segment based on the Selected Encoding Bitrate", where the segment of the source video may be encoded using the first video codec and based on the selected encoding bitrate. For example, decoder 202 as implemented via logic circuitry 630 may encode a segment of a source video based on the selected encoding bitrate.

Furthermore, the bitstream of the encoded segment may be provided to a receiving device, which may decode the bitstream and present video to a user. For example, decoder 202 as implemented via logic circuitry 630 may provide the encoded bitstream (e.g., encoded base don the selected encoding bitrate) to antenna 602 for wireless transmission to a receiving device.

The operations of process 500 may be repeated any number of times either in series or in parallel for any number of segments of a source video and/or for any number of source videos.

Various components of the systems described herein may be implemented in software, firmware, and/or hardware and/or any combination thereof. For example, various components of devices 101 or 800 or systems 200, 300, 600, or 700 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of devices 101 or 800 or systems 200, 300, 600, or 700, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 7:
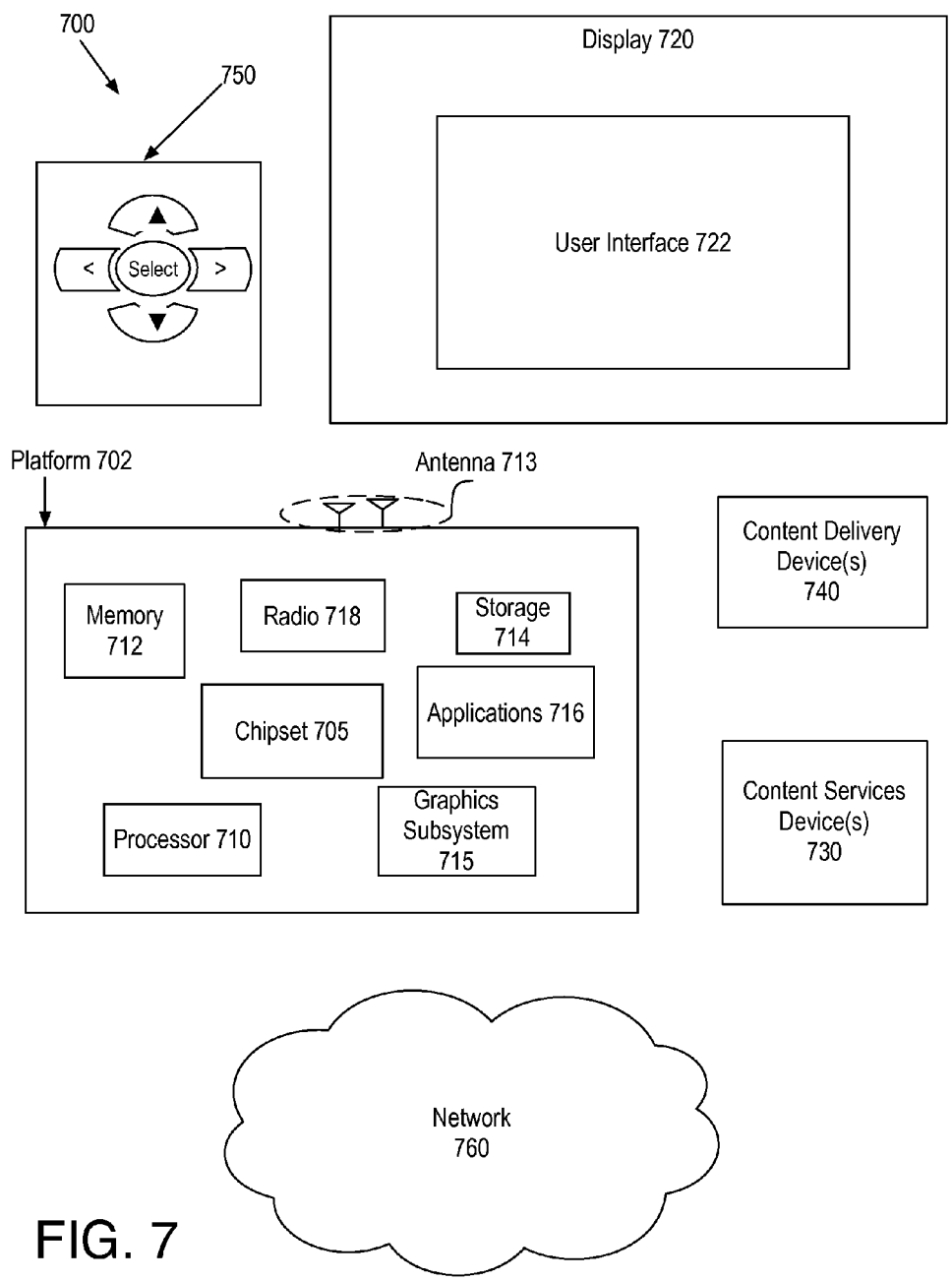
FIG. 7 is an illustrative diagram of an example system.

FIG. 7 is an illustrative diagram of an example system 700, arranged in accordance with at least some implementations of the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, antenna 713, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone device communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of uni-directionally or bi-directionally communicating content between content providers and platform 702 and/display 720, via network 760 or directly. It will be appreciated that the content may be communicated uni-directionally and/or bi-directionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In various embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In various embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
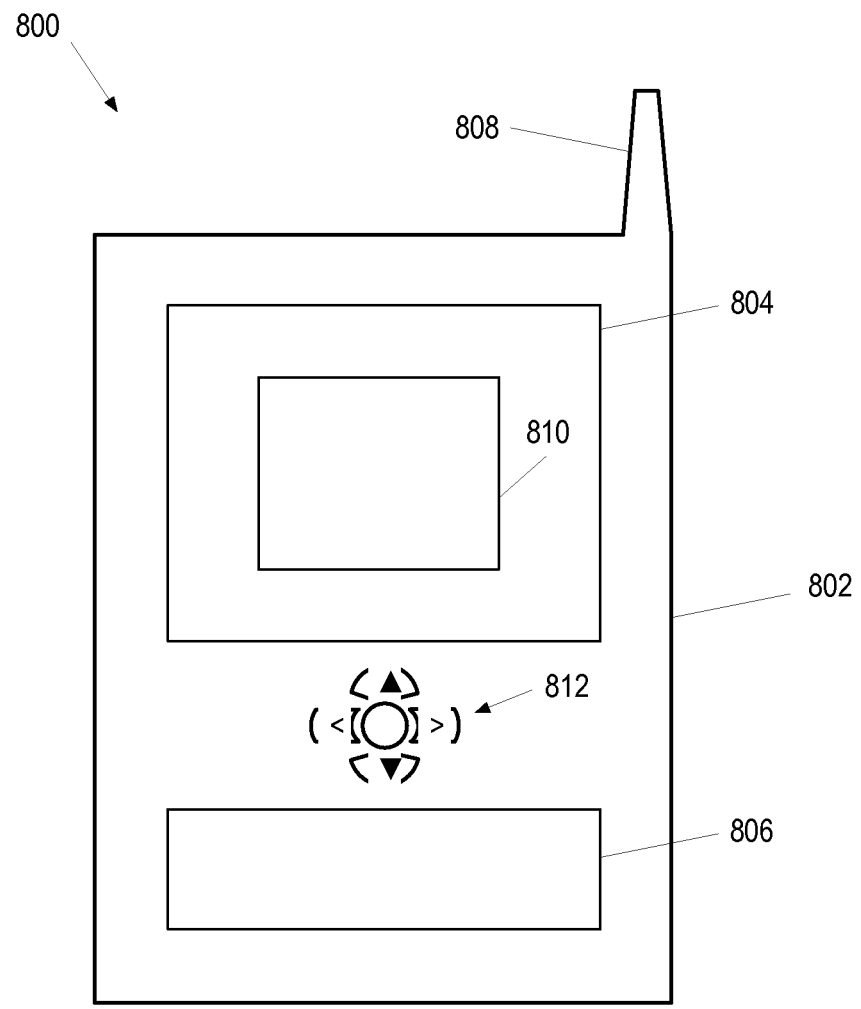
FIG. 8 illustrates an example device, all arranged in accordance with at least some implementations of the present disclosure.

As described above, system 700 may be embodied in varying physical styles or form factors. FIG. 8 illustrates implementations of a small form factor device 800 in which system 800 may be embodied. In various embodiments, for example, device 800 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alpha-numeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for encoding video content for wireless transmission comprises determining a first, a second, and a third candidate bitrate for encoding, using a first video codec, a segment of a source video, wherein the first candidate bitrate comprises a bitrate for the source video encoded using a second video codec modified by a scaling factor, wherein the second candidate bitrate comprises an average bitrate for at least one of the segment of the source video encoded using the first video codec or a previous segment of the source video encoded using the first video codec, and wherein the third candidate bitrate comprises an encoding bitrate prediction for at least one of the segment encoded using the first video codec or the previous segment encoded using the first video codec, selecting an encoding bitrate for the segment of the source video as a minimum of the first, second, and third candidate bitrates, and encoding, using the first video codec, the segment of the source video based on the selected encoding bitrate.

Further to the first embodiments, the method further comprises determining a fourth candidate bitrate for encoding, using the first video codec, a second segment of a second source video, wherein the fourth candidate bitrate comprises a bitrate for the second source video encoded using a third video codec modified by a second scaling factor, and wherein the scaling factor is different than the second scaling factor.

Further to the first embodiments, the first video codec is a local video codec associated with the wireless transmission and wherein the second video codec is associated with a compression of the source video.

Further to the first embodiments, the encoding bitrate prediction is based at least in part on one of a predetermined mean opinion score, a predetermined maximum bitrate, a predetermined minimum bitrate, or a display quality coefficient associated with a receiving device of the wireless transmission.

Further to the first embodiments, determining the third candidate bitrate based on the encoding bitrate prediction comprises analyzing a bitstream of the segment encoded using the first video codec or the previous segment encoded using the first video codec to determine segment bitstream parameters, determining a temporal complexity based on the segment bitstream parameters, and generating a bitrate prediction based on the temporal complexity and a pre-trained bitrate prediction model.

Further to the first embodiments, determining the third candidate bitrate based on the encoding bitrate prediction comprises analyzing a bitstream of the segment encoded using the first video codec or the previous segment encoded using the first video codec to determine segment bitstream parameters, determining a temporal complexity based on the segment bitstream parameters, and generating a bitrate prediction based on the temporal complexity and a pre-trained bitrate prediction model, wherein the segment bitstream parameters comprise at least one of an average bits per pixel of the segment, an average quantization parameter of the segment, an encoding frame rate of the segment, or an encoding video height of the segment.

Further to the first embodiments, determining the third candidate bitrate based on the encoding bitrate prediction comprises analyzing a bitstream of the segment encoded using the first video codec or the previous segment encoded using the first video codec to determine segment bitstream parameters, determining a temporal complexity based on the segment bitstream parameters, and generating a bitrate prediction based on the temporal complexity and a pre-trained bitrate prediction model, wherein generating the bitrate prediction is further based on a predetermined mean opinion score, a predetermined maximum bitrate, a predetermined minimum bitrate, and a display quality coefficient associated with a receiving device of the wireless transmission.

Further to the first embodiments, determining the third candidate bitrate based on the encoding bitrate prediction comprises analyzing a bitstream of the segment encoded using the first video codec or the previous segment encoded using the first video codec to determine segment bitstream parameters, determining a temporal complexity based on the segment bitstream parameters, and generating a bitrate prediction based on the temporal complexity and a pre-trained bitrate prediction model, wherein generating the bitrate prediction is further based on a predetermined mean opinion score, a predetermined maximum bitrate, a predetermined minimum bitrate, and a display quality coefficient associated with a receiving device of the wireless transmission, and wherein the display quality coefficient associated with the receiving device is determined using a look up table based on resolution information received from the receiving device.

Further to the first embodiments, the second candidate bitrate and the third candidate bitrate are determined based on the previous segment of the source video, and wherein the previous segment is immediately prior to the segment of the source video.

Further to the first embodiments, the method further comprises wirelessly transmitting a resultant bitstream generated via the encoding of the segment to a receiving device.

In one or more second embodiments, a system for encoding video content for wireless transmission comprises a memory configured to store video data and a processing unit coupled to the memory, wherein the processing unit comprises encoded source video based bitrate determination circuitry configured to determine a first candidate bitrate for encoding, based on a first video codec, a segment of a source video, wherein the first candidate bitrate comprises a bitrate for the source video encoded using a second video codec modified by a scaling factor, segment average bitrate determination circuitry configured to determine a second candidate bitrate for encoding, based on the first video codec, the segment of the source video, wherein the second candidate bitrate comprises an average bitrate for at least one of the segment of the source video encoded using the first video codec or a previous segment of the source video encoded using the first video codec, encoding bitrate prediction circuitry configured to determine a third candidate bitrate for encoding, based on the first video codec, the segment of the source video, wherein the third candidate bitrate comprises an encoding bitrate prediction for at least one of the segment encoded using the first video codec or the previous segment encoded using the first video codec, bitrate selection circuitry configured to select an encoding bitrate for the segment of the source video as a minimum of the first, second, and third candidate bitrates, and encoder circuitry configured to encode, based on the first video codec, the segment of the source video based on the selected encoding bitrate.

Further to the second embodiments, the encoded source video based bitrate determination circuitry is further configured to determine a fourth candidate bitrate for encoding, using the first video codec, a second segment of a second source video, wherein the fourth candidate bitrate comprises a bitrate for the second source video encoded using a third video codec modified by a second scaling factor, and wherein the scaling factor is different than the second scaling factor.

Further to the second embodiments, the first video codec is a local video codec associated with the wireless transmission and wherein the second video codec is associated with a compression of the source video.

Further to the second embodiments, the encoding bitrate prediction is based at least in part on one of a predetermined mean opinion score, a predetermined maximum bitrate, a predetermined minimum bitrate, or a display quality coefficient associated with a receiving device of the wireless transmission.

Further to the second embodiments, the encoding bitrate prediction circuitry being configured to determine the third candidate bitrate comprises the encoding bitrate prediction circuitry being configured to analyze a bitstream of the segment encoded using the first video codec or the previous segment encoded using the first video codec to determine segment bitstream parameters, determine a temporal complexity based on the segment bitstream parameters, and generate a bitrate prediction based on the temporal complexity and a pre-trained bitrate prediction model.

Further to the second embodiments, the encoding bitrate prediction circuitry being configured to determine the third candidate bitrate comprises the encoding bitrate prediction circuitry being configured to analyze a bitstream of the segment encoded using the first video codec or the previous segment encoded using the first video codec to determine segment bitstream parameters, determine a temporal complexity based on the segment bitstream parameters, and generate a bitrate prediction based on the temporal complexity and a pre-trained bitrate prediction model, wherein the segment bitstream parameters comprise at least one of an average bits per pixel of the segment, an average quantization parameter of the segment, an encoding frame rate of the segment, or an encoding video height of the segment.

Further to the second embodiments, the encoding bitrate prediction circuitry being configured to determine the third candidate bitrate comprises the encoding bitrate prediction circuitry being configured to analyze a bitstream of the segment encoded using the first video codec or the previous segment encoded using the first video codec to determine segment bitstream parameters, determine a temporal complexity based on the segment bitstream parameters, and generate a bitrate prediction based on the temporal complexity and a pre-trained bitrate prediction model, wherein the generated bitrate prediction is further based on a predetermined mean opinion score, a predetermined maximum bitrate, a predetermined minimum bitrate, and a display quality coefficient associated with a receiving device of the wireless transmission.

Further to the second embodiments, the encoding bitrate prediction circuitry being configured to determine the third candidate bitrate comprises the encoding bitrate prediction circuitry being configured to analyze a bitstream of the segment encoded using the first video codec or the previous segment encoded using the first video codec to determine segment bitstream parameters, determine a temporal complexity based on the segment bitstream parameters, and generate a bitrate prediction based on the temporal complexity and a pre-trained bitrate prediction model, wherein the generated bitrate prediction is further based on a predetermined mean opinion score, a predetermined maximum bitrate, a predetermined minimum bitrate, and a display quality coefficient associated with a receiving device of the wireless transmission, the system further comprising a look up table comprising the display quality coefficient associated with resolution information of the receiving.

Further to the second embodiments, the second candidate bitrate and the third candidate bitrate are determined based on the previous segment of the source video, and wherein the previous segment is immediately prior to the segment of the source video.

Further to the second embodiments, the second candidate bitrate and the third candidate bitrate are based on the previous segment of the source video, and wherein the previous segment is immediately prior to the segment of the source video.

Further to the second embodiments, the system comprises at least a portion of a computer, a laptop, an ultrabook, a smartphones, or a tablet.

In one or more third embodiments, a system for encoding video content for wireless transmission comprises a memory configured to store video data and a processing unit coupled to the memory, wherein the processing unit comprises means for determining a first, a second, and a third candidate bitrate for encoding, using a first video codec, a segment of a source video, wherein the first candidate bitrate comprises a bitrate for the source video encoded using a second video codec modified by a scaling factor, wherein the second candidate bitrate comprises an average bitrate for at least one of the segment of the source video encoded using the first video codec or a previous segment of the source video encoded using the first video codec, and wherein the third candidate bitrate comprises an encoding bitrate prediction for at least one of the segment encoded using the first video codec or the previous segment encoded using the first video codec, means for selecting an encoding bitrate for the segment of the source video as a minimum of the first, second, and third candidate bitrates, and means for encoding, using the first video codec, the segment of the source video based on the selected encoding bitrate.

Further to the third embodiments, the processing unit further comprises means for determining a fourth candidate bitrate for encoding, using the first video codec, a second segment of a second source video, wherein the fourth candidate bitrate comprises a bitrate for the second source video encoded using a third video codec modified by a second scaling factor, and wherein the scaling factor is different than the second scaling factor.

Further to the third embodiments, the means for determining the first, the second, and the third candidate bitrate comprises means for analyzing a bitstream of the segment encoded using the first video codec or the previous segment encoded using the first video codec to determine segment bitstream parameters, means for determining a temporal complexity based on the segment bitstream parameters, and means generating a bitrate prediction as the third candidate bitrate based on the temporal complexity and a pre-trained bitrate prediction model.

Further to the third embodiments, the means for determining the first, the second, and the third candidate bitrate comprises means for analyzing a bitstream of the segment encoded using the first video codec or the previous segment encoded using the first video codec to determine segment bitstream parameters, means for determining a temporal complexity based on the segment bitstream parameters, and means generating a bitrate prediction as the third candidate bitrate based on the temporal complexity and a pre-trained bitrate prediction model, wherein the segment bitstream parameters comprise at least one of an average bits per pixel of the segment, an average quantization parameter of the segment, an encoding frame rate of the segment, or an encoding video height of the segment.

In one or more fourth embodiments, a machine readable medium comprises a plurality of instructions that in response to being executed on a computing device, cause the computing device to encode video content for wireless transmission by determining a first, a second, and a third candidate bitrate for encoding, using a first video codec, a segment of a source video, wherein the first candidate bitrate comprises a bitrate for the source video encoded using a second video codec modified by a scaling factor, wherein the second candidate bitrate comprises an average bitrate for at least one of the segment of the source video encoded using the first video codec or a previous segment of the source video encoded using the first video codec, and wherein the third candidate bitrate comprises an encoding bitrate prediction for at least one of the segment encoded using the first video codec or the previous segment encoded using the first video codec, selecting an encoding bitrate for the segment of the source video as a minimum of the first, second, and third candidate bitrates, and encoding, using the first video codec, the segment of the source video based on the selected encoding bitrate.

Further to the fourth embodiments, the machine readable medium comprises further instructions that cause the computing device to encode video content for wireless transmission by determining a fourth candidate bitrate for encoding, using the first video codec, a second segment of a second source video, wherein the fourth candidate bitrate comprises a bitrate for the second source video encoded using a third video codec modified by a second scaling factor, and wherein the scaling factor is different than the second scaling factor.

Further to the fourth embodiments, the encoding bitrate prediction is based at least in part on one of a predetermined mean opinion score, a predetermined maximum bitrate, a predetermined minimum bitrate, or a display quality coefficient associated with a receiving device of the wireless transmission.

Further to the fourth embodiments, determining the third candidate bitrate based on the encoding bitrate prediction comprises analyzing a bitstream of the segment encoded using the first video codec or the previous segment encoded using the first video codec to determine segment bitstream parameters, determining a temporal complexity based on the segment bitstream parameters, and generating a bitrate prediction based on the temporal complexity and a pre-trained bitrate prediction model.

Further to the fourth embodiments, determining the third candidate bitrate based on the encoding bitrate prediction comprises analyzing a bitstream of the segment encoded using the first video codec or the previous segment encoded using the first video codec to determine segment bitstream parameters, determining a temporal complexity based on the segment bitstream parameters, and generating a bitrate prediction based on the temporal complexity and a pre-trained bitrate prediction model, wherein the segment bitstream parameters comprise at least one of an average bits per pixel of the segment, an average quantization parameter of the segment, an encoding frame rate of the segment, or an encoding video height of the segment.

Further to the fourth embodiments, determining the third candidate bitrate based on the encoding bitrate prediction comprises analyzing a bitstream of the segment encoded using the first video codec or the previous segment encoded using the first video codec to determine segment bitstream parameters, determining a temporal complexity based on the segment bitstream parameters, and generating a bitrate prediction based on the temporal complexity and a pre-trained bitrate prediction model, wherein generating the bitrate prediction is further based on a predetermined mean opinion score, a predetermined maximum bitrate, a predetermined minimum bitrate, and a display quality coefficient associated with a receiving device of the wireless transmission.

In on or more fifth embodiments, at least one machine readable medium may include a plurality of instructions that in response to being executed on a computing device, causes the computing device to perform a method according to any one of the above embodiments.

In on or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for encoding video content for wireless transmission comprising:
 determining a first, a second, and a third candidate bitrate for encoding, using a first video codec, a segment of a source video,
  wherein the first candidate bitrate comprises a bitrate for the source video encoded using a second video codec modified by a scaling factor to compensate for differences between the first and second codecs,
  wherein the second candidate bitrate comprises an average bitrate for at least one of the segment of the source video encoded using the first video codec or a previous segment of the source video encoded using the first video codec, and
  wherein the third candidate bitrate comprises an encoding bitrate prediction that is based on a pre-trained bitrate predication model used to compute the third candidate bitrate for at least one of the segment encoded using the first video codec or the previous segment encoded using the first video codec;
 selecting an encoding bitrate for the segment of the source video as a minimum of the first, second, and third candidate bitrates; and
 encoding, using the first video codec, the segment of the source video based on the selected encoding bitrate.

2. The method of claim 1, further comprising:
 determining a fourth candidate bitrate for encoding, using the first video codec, a second segment of a second source video, wherein the fourth candidate bitrate comprises a bitrate for the second source video encoded using a third video codec modified by a second scaling factor, and wherein the scaling factor is different than the second scaling factor.

3. The method of claim 1, wherein the first video codec is a local video codec associated with the wireless transmission and wherein the second video codec is associated with a compression of the source video.

4. The method of claim 1, wherein the encoding bitrate prediction is based at least in part on one of a predetermined mean opinion score that indicates a desired display quality, a predetermined maximum bitrate, a predetermined minimum bitrate, and a display quality coefficient associated with a receiving device of the wireless transmission.

5. The method of claim 1, wherein determining the third candidate bitrate based on the encoding bitrate prediction comprises:
 analyzing a bitstream of the segment encoded using the first video codec or the previous segment encoded using the first video codec to determine segment bitstream parameters;
 determining a temporal complexity based on the segment bitstream parameters; and
 generating a bitrate prediction based on the temporal complexity and the pre-trained bitrate prediction model.

6. The method of claim 5, wherein the segment bitstream parameters comprise at least one of an average bits per pixel of the segment, an average quantization parameter of the segment, an encoding frame rate of the segment, or an encoding video height of the segment.

7. The method of claim 5, wherein generating the bitrate prediction is further based on a predetermined mean opinion score, a predetermined maximum bitrate, a predetermined minimum bitrate, and a display quality coefficient associated with a receiving device of the wireless transmission.

8. The method of claim 7, wherein the display quality coefficient associated with the receiving device is determined using a look up table based on resolution information received from the receiving device.

9. The method of claim 1, wherein the second candidate bitrate and the third candidate bitrate are determined based on the previous segment of the source video, and wherein the previous segment is immediately prior to the segment of the source video.

10. The method of claim 1, further comprising:
 wirelessly transmitting a resultant bitstream generated via the encoding of the segment to a receiving device.

11. A system for encoding video content for wireless transmission, comprising:
 a memory configured to store video data; and
 a processing unit coupled to the memory, wherein the processing unit comprises:
  encoded source video based bitrate determination circuitry configured to determine a first candidate bitrate for encoding, based on a first video codec, a segment of a source video, wherein the first candidate bitrate comprises a bitrate for the source video encoded using a second video codec modified by a scaling factor to compensate for differences between the first and second codecs;
  segment average bitrate determination circuitry configured to determine a second candidate bitrate for encoding, based on the first video codec, the segment of the source video, wherein the second candidate bitrate comprises an average bitrate for at least one of the segment of the source video encoded using the first video codec or a previous segment of the source video encoded using the first video codec;
  encoding bitrate prediction circuitry configured to determine a third candidate bitrate for encoding, based on the first video codec, the segment of the source video, wherein the third candidate bitrate comprises an encoding bitrate prediction that is based on a pre-trained bitrate predication model used to compute the third candidate bitrate and for at least one of the segment encoded using the first video codec or the previous segment encoded using the first video codec;
  bitrate selection circuitry configured to select an encoding bitrate for the segment of the source video as a minimum of the first, second, and third candidate bitrates; and
  encoder circuitry configured to encode, based on the first video codec, the segment of the source video based on the selected encoding bitrate.

12. The system of claim 11, wherein the encoded source video based bitrate determination circuitry is further configured to determine a fourth candidate bitrate for encoding, using the first video codec, a second segment of a second source video, wherein the fourth candidate bitrate comprises a bitrate for the second source video encoded using a third video codec modified by a second scaling factor, and wherein the scaling factor is different than the second scaling factor.

13. The system of claim 11, wherein the encoding bitrate prediction is based at least in part on one of a predetermined mean opinion score that indicates a desired display quality, a predetermined maximum bitrate, a predetermined minimum bitrate, or a display quality coefficient associated with a receiving device of the wireless transmission.

14. The system of claim 11, wherein the encoding bitrate prediction circuitry being configured to determine the third candidate bitrate comprises the encoding bitrate prediction circuitry being configured to:
analyze a bitstream of the segment encoded using the first video codec or the previous segment encoded using the first video codec to determine segment bitstream parameters;
determine a temporal complexity based on the segment bitstream parameters; and
generate a bitrate prediction based on the temporal complexity and the pre-trained bitrate prediction model.

15. The system of claim 14, wherein the segment bitstream parameters comprise at least one of an average bits per pixel of the segment, an average quantization parameter of the segment, an encoding frame rate of the segment, or an encoding video height of the segment.

16. The system of claim 14, wherein the generated bitrate prediction is further based on a predetermined mean opinion score, a predetermined maximum bitrate, a predetermined minimum bitrate, and a display quality coefficient associated with a receiving device of the wireless transmission.

17. The system of claim 11, wherein the second candidate bitrate and the third candidate bitrate are determined based on the previous segment of the source video, and wherein the previous segment is immediately prior to the segment of the source video.

18. The system of claim 11, wherein the system comprises at least a portion of a computer, a laptop, an ultrabook, a smartphones, or a tablet.

19. At least one non-transitory machine readable medium comprising a plurality of instructions that in response to being executed on a computing device, cause the computing device to encode video content for wireless transmission by:
determining a first, a second, and a third candidate bitrate for encoding, using a first video codec, a segment of a source video,
wherein the first candidate bitrate comprises a bitrate for the source video encoded using a second video codec modified by a scaling factor to compensate for differences between the first and second codecs,
wherein the second candidate bitrate comprises an average bitrate for at least one of the segment of the source video encoded using the first video codec or a previous segment of the source video encoded using the first video codec, and
wherein the third candidate bitrate comprises an encoding bitrate prediction that is based on a pre-trained bitrate predication model used to compute the third candidate bitrate and for at least one of the segment encoded using the first video codec or the previous segment encoded using the first video codec;
selecting an encoding bitrate for the segment of the source video as a minimum of the first, second, and third candidate bitrates; and
encoding, using the first video codec, the segment of the source video based on the selected encoding bitrate.

20. The machine readable medium of claim 19, further comprising instructions that cause the computing device to encode video content for wireless transmission by:
determining a fourth candidate bitrate for encoding, using the first video codec, a second segment of a second source video, wherein the fourth candidate bitrate comprises a bitrate for the second source video encoded using a third video codec modified by a second scaling factor, and wherein the scaling factor is different than the second scaling factor.

21. The machine readable medium of claim 19, wherein the encoding bitrate prediction is based at least in part on one of a predetermined mean opinion score, a predetermined maximum bitrate, a predetermined minimum bitrate, or a display quality coefficient associated with a receiving device of the wireless transmission.

22. The machine readable medium of claim 19, wherein determining the third candidate bitrate based on the encoding bitrate prediction comprises:
analyzing a bitstream of the segment encoded using the first video codec or the previous segment encoded using the first video codec to determine segment bitstream parameters;
determining a temporal complexity based on the segment bitstream parameters; and
generating a bitrate prediction based on the temporal complexity and the pre-trained bitrate prediction model.

23. The machine readable medium of claim 22, wherein the segment bitstream parameters comprise at least one of an average bits per pixel of the segment, an average quantization parameter of the segment, an encoding frame rate of the segment, or an encoding video height of the segment.

24. The machine readable medium of claim 22, wherein generating the bitrate prediction is further based on a predetermined mean opinion score that indicates a desired display quality, a predetermined maximum bitrate, a predetermined minimum bitrate, and a display quality coefficient associated with a receiving device of the wireless transmission.

* * * * *